March 24, 1970    J. F. RICHTER    3,502,929
HIGH INTENSITY ARC LAMP
Filed July 14, 1967

INVENTOR.
JOHN F. RICHTER
BY Robert W. Dilts
ATTORNEY

United States Patent Office 3,502,929
Patented Mar. 24, 1970

3,502,929
HIGH INTENSITY ARC LAMP
John F. Richter, San Francisco, Calif., assignor to Varian Associates, Palo Alto, Calif., a corporation of California
Filed July 14, 1967, Ser. No. 655,717
Int. Cl. H01j 5/16, 61/40
U.S. Cl. 313—111                                17 Claims

ABSTRACT OF THE DISCLOSURE

A novel structure is described for a gas discharge lamp adapted for operation in the short arc mode and capable of producing increased light flux density as well as increased total light at a given light flux density. The structure includes a compact ceramic envelope to provide high power handling capability in terms of current and voltage and to enable containment of ionizable gases at high pressures. Improvements in efficiency through incorporation of a light reflector within the envelope and the use of sapphire and other special window materials, are described.

BACKGROUND OF THE INVENTION

This invention relates to a gaseous discharge device and particularly to a novel high intensity short arc lamp structure.

In optical projection systems involving the generation and precisely controlled radiation of long pulses of non-coherent light, such as in spectroscopy, microscopy, and solar simulation, in addition to the more conventional projection systems, there is a need for a light source capable of producing the highest possible light flux density, that is, the greatest total amount of light from the least possible volume. The ideal would be a point source of light with unlimited light output.

Of the electrical devices for the generation of non-coherent light in pulses of substantial length, gas discharge devices offer the possibility of generating the greatest total quantity of light from the least possible volume (i.e., light flux density). The light flux density which can be produced by incandescent or luminescent devices is limited by the amount of power that can be concentrated in the solid materials which serve as the light emitters before a change of state occurs in such material, whereas in a gas discharge device no such change of state can occur in the light emitting medium regardless of the concentration of power.

The amount of power which can be concentrated in a gas discharge may be maximized by decreasing the spacing between the electrodes of the device and increasing the pressure of the gaseous medium, the voltage at which the discharge operates, and the current carried by the arc. It has been found that for any given voltage and current the greatest light flux density will be obtained when the electrode spacing and gas pressure are adjusted to produce an arc discharge which is roughly spherical (that is, the length of the arc is approximately equal to its transverse dimensions). In this mode of operation the electrode spacing is less than two centimeters and usually less than one centimeter. Arc discharge devices designed to operate in this mode are called "short arc" devices to distinguish them from other forms of arc discharge such as "medium arc" and "long arc" devices which may produce larger total quantities of light but at much lower light flux density.

According to the teaching of the prior art short arc lamps consist of a vacuum-tight, transparent bulb located adjacent a reflector. The reflector is often fixed to an outer housing or casing which at least partially surrounds the bulb, and which has a window through which light from the arc passes. The bulb envelope is usually made of amorphous fused silica in a tubular shape. Housed within the fused silica envelope along its tubular axis are a pair of electrodes. A small space between these electrodes defines an arc gap. A spherical aneurism in the envelope surrounds the arc gap to reduce the intensity of the heat to which the fused silica will be subjected during lamp operations. The tubular shape of the envelope is also based upon heat considerations for it provides two ends relatively remote from the arc. The electrodes are sealed through the envelope at these ends and are thus located at the coolest part of the enevelope. Prior to envelope sealing the bulb is filled with an inert gas or metal vapor under some 2 to 15 atmospheres of pressure at room temperature. At operating temperatures the gas pressure can be expected to increase to some 10 to 50 atmospheres.

The short arc lamps of the prior art, such as that just described, are limited both in the light flux density which they are capable of producing and in total amount of light that they can produce at a given light flux density. Applicant's structure disclosed and claimed herein makes possible the production of both greater light flux density and a greater total amount of light at a given light flux density, than short arc devices of the prior art.

As explained above, reflectors in the prior art have been spacially separated from the bulb. This increases the overall size and weight of the lamp. It also creates a maintenance of alignment problem under shock and vibrant environmental conditions. Furthermore, light passing through the bulb to, and in some designs from, the reflector is diffused and refracted thereby lowering the collector efficiency of the device. Applicant's structure described and claimed herein largely eliminates these disadvantages.

The electrodes or their wiring, within the bulbs of the prior art lamps have had to possess significant length in traversing the tubulation between the arc gap and the metal-to-fused silica seals located at the cooler ends of the tubular bulbs. Inductance of this length of wiring impeded the arc current whenever the lamp was operated in a pulse mode. Applicant's structure described and claimed herein, enables a reduction in the length of this internal wiring and a corresponding reduction in inductance.

Finally, at least a portion of the bulb envelopes in the prior art has served as a bulb window. In some configurations a second window has been provided in the outer housing. Though the housing window could be open air, the bulb window was made of the same fused silica as that of the envelope. This material, though transparent to light in the near infrared, visible and ultraviolet regions of the electromagnetic spectrum, is opaque to that of the far infrared and ultraviolet regions. Where utility in these latter regions has been specified, short arc lamps of the prior art cannot be used. Applicant's structure disclosed and claimed herein permits use of special window materials transparent in all of these regions, such as sapphire, lithium fluoride and magnesium fluoride.

Accordingly, it is an object of the present invention to provide an improved high intensity arc lamp.

It is also an object of the invention to provide a short arc high intensity lamp having a composite, integral bulb and reflector.

Another object of the present invention is to provide a rugged, high intensity arc lamp having no glass-to-metal seals, and having an envelope composed of materials which will withstand severe shock, vibration, heat and pressure environmental conditions, and which will not react with the gaseous atmosphere of the lamp.

Yet another object of the invention includes production of a compact high intensity arc lamp having low inductance electrodes and electrode terminals, high collector and energy conversion efficiency, and windows pervious to the passage of electromagnetic energy in the region bounded by the far-ultraviolet and far-infrared.

SUMMARY OF THE INVENTION

Briefly described, the present invention is a high intensity, short arc lamp comprising a sealed envelope, a portion of which is ceramic. The envelope houses a cathode an an anode which are spaced apart a distance less than two centimeters to define a short arc gap therebetween. The envelope also houses an ionizable gas under at least two standard atmospheres of pressure. A reflector and a sapphire window may also form a portion of the envelope.

DESCRIPTION OF PRIOR ART

Figure 1:
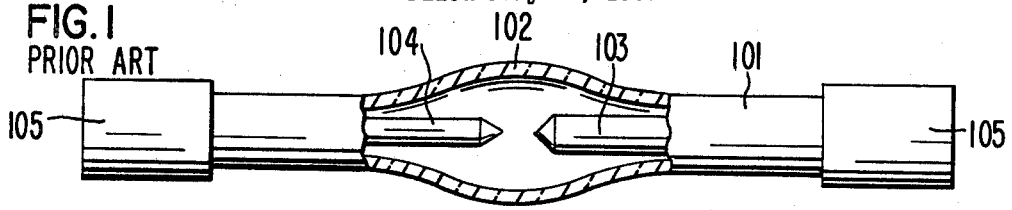
FIGURE 1 is an elevational view partly in cross-section of a typical high intensity short arc lamp structure of the prior art.

Referring now in detail to the drawing, there is illustrated in FIGURE 1 the structure of a high intensity short arc lamp of the prior art comprising a sealed, fused silica, tubular envelope 101 having an elliptical aneurism 102 surrounding an arc gap between two coaxially aligned and axially spaced electrodes 103 and 104. Two metallic cups 105 may be fixed to the ends of the tubular envelope and to the adjacent electrodes to protect the seals between the electrodes 103 and 104 and to provide electrical terminals. A reflector, not shown, is typically located near the bulb.

Short arc discharge structures of the prior art, such as described above, are limited both in the light flux density at which they can operate and in the total amount of light they are capable of producing at a given light flux density. As pointed out above, the amount of power which can be concentrated in a gas discharge is an inverse function of the spacing between the electrodes and a direct function of the pressure of the gaseous medium, the voltage at which the discharge operates and the current carried by the arc. It has been found that the total amount of light which a structure of the prior art is capable of producing at a given light flux density is limited by the amount of current which can be passed through the device due to the mismatch in thermal coefficient of expansion between the electrodes and the envelope. Expensive and structurally complex graded seals have been used in order to reduce such mismatch but such seals are limited in the amount of temperature which they can withstand. Thus, if the current flow through electrodes of given size is increased the electrodes tend to be heated to a higher temperature resulting in destruction of the seal. If the size of the electrodes is increased to accommodate greater current flow, the mismatch in thermal coefficient of expansion is accentuated and the ultimate temperature which the seals can withstand is reduced.

The above structural limitations also limit the light flux density which can be produced. However, limitations imposed by the tensile strength of the envelope material on the amount of gas pressure which can be used adds a further limitation with respect to light flux density. If the size of the device is reduced in order to enable the use of higher unit pressures without exceeding the total tensile stress which the envelope material can withstand, then the electrodes must be made correspondingly smaller, limiting the electrical current which can be passed through the device for the reasons previously discussed. In addition, making a smaller device tends to bring the envelope material closer to the arc discharge resulting in limitations imposed by the increased heating of the envelope by the arc.

Other disadvantages of the prior art structure including the electrical inductance introduced by attempts to elongate the electrodes in order to remove the seals from the high temperature of the arc, the tendency of the envelope material to devitrify and the optical inefficiency of the envelope material have been mentioned above. In addition, the mechanical weakness of the structure of the prior art should be noted. Not only is the envelope material structurally weak but the elongated form of the structure imposes practical limitations both on the ultimate size and power handling capability thereof and on the applications in which the structure may be used.

DESCRIPTION OF PREFERRED EMBODIMENTS

Figure 2:
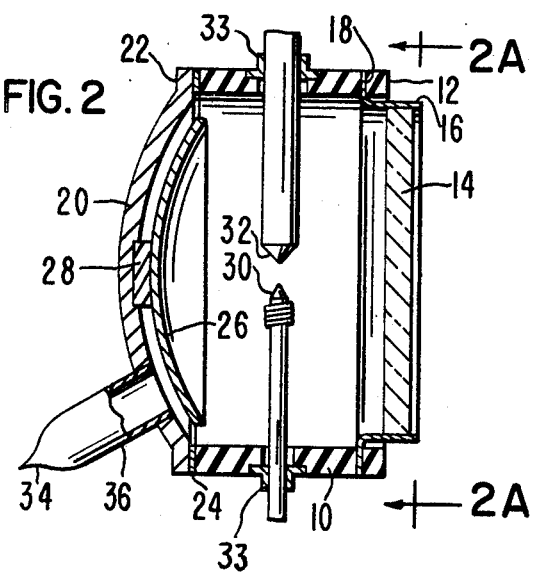
FIGURE 2 is a cross-sectional view of one embodiment of high intensity short arc lamp structure of the present invention.
Figure 2A:
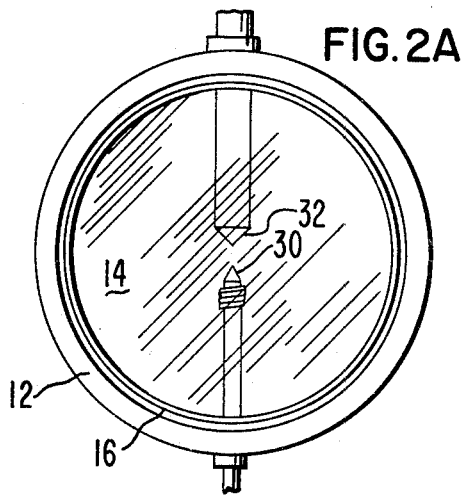
FIGURE 2a is a frontal view of the lamp in FIGURE 2.

There is illustrated in FIGURES 2 and 2a a high intensity short arc lamp having a ceramic cylinder section 10 and a ceramic ring 12 forming portions of a sealed envelope. A transparent window 14 of sapphire, for example, in the form of a disc is peripherally brazed to a metallic ring 16 having a flange 18 sandwiched between and brazed to one end of ceramic members 10 and 12. A spherical metallic back plate 20, having a flanged periphery 22, is brazed to a ductile metallic ring 24 which in turn is brazed to the other end of the ceramic cylinder section 10. Spherical back plate 20 is preferably made of stainless steel or Kovar. The surface of the reflector 26 is preferably coated with rhodium. The reflector is mounted on back plate 20 by copper support block 28. A cathode 30 and an anode 32 radially penetrate opposing apertures in the sides of the ceramic cylinder section 10 along a common axis. Metallic stress relief rings 33 are brazed at their inner periphery to these electrodes 30 and 32 in vacuum tight relation and are sealed at their outer periphery to the periphery of the associated aperture in the side wall of ceramic cylinder section 10. The electrodes are made of a refractory metal—the anode preferably of tungsten and cathode of thoriated tungsten. The ends of these electrodes are axially spaced a distance of less than one centimeter to provide a short arc gap. The lamp is filled with an ionizable gas which may be under 25 atmospheres of pressure, for example, and sealed at pinch-off 34 in exhaust tubulation 36.

The ceramic may be either alumina ($Al_2O_3$) or beryllia (BeO) which are commercially available in various degrees of purity. Beryllia has the advantage of being a better heat conductor than alumina but it is more expensive. The ceramic-to-metal seals may be made with melt alloy brazes in which copper-silver braze fillers are placed between the metallic and ceramic members after the surface of the ceramics has first been coated with a molybdenum manganese metalizer for example, or the ceramic-to-metal seals may be made with active alloy brazes such as titanium and nickel, in which case the ceramics need not be first metalized. Various other ceramic-to-metal seal materials and methods are well known and used extensively in the electron tube art. In a specific embodiment of the high intensity lamp of FIGURE 2 the inner diameter of the ceramic cylinder section 10 is 1½ inches, the electrodes are spaced approximately 4 mm. apart and the ionized gas is xenon at 25 atmospheres. Such a lamp consumes approximately 150 watts of power at 20 volts DC; drawing approximately 7.5 ampers of current. In operation the envelope can withstand an internal gas pressure of 30 atmospheres with a safety factor of three.

Figure 3:
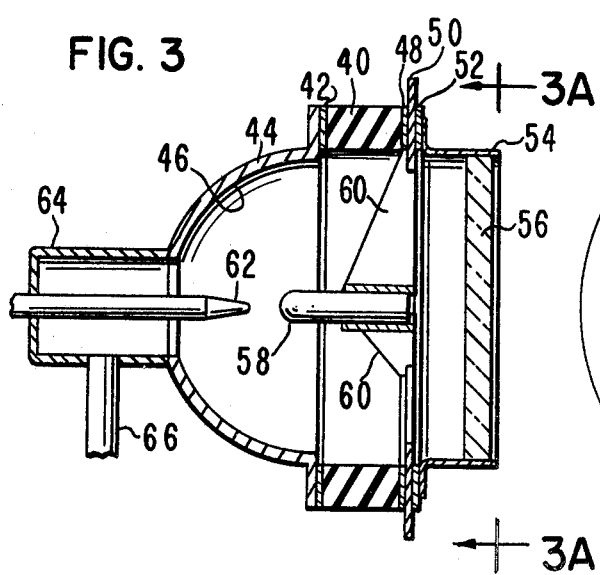
FIGURE 3 is a cross-sectional view of another embodiment of a high intensity short arc lamp structure of the present invention.
Figure 3A:
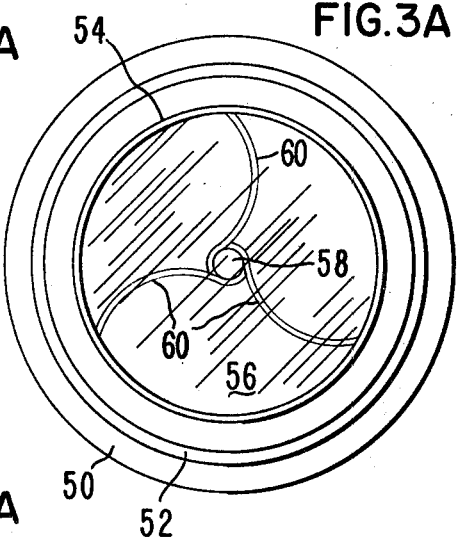
FIGURE 3a is a frontal view of the lamp in FIGURE 3.

FIGURES 3 and 3a illustrate another embodiment of the present invention in which the electrodes are oriented along an axis parallel to the lamp beam. One end of the ceramic cylinder section 40, which preferably is made of polycrystalline alumina, is brazed to a ductile metallic (copper, for example) ring 42 which in turn is brazed to a metallic (Kover or stainless steel, for example) member 44 of the lamp envelope. The metallic member 44 may be spherical, ellipsoidal or parabolic. The ductile metallic ring serves as a stress relieving portion of the envelope. The inner surface of member 44 serves as integral reflector 46. The other end of ceramic member 40 is brazed to a ductile metallic ring 48 which in turn is brazed to one side of a rigid metallic terminal ring 50. The terminal ring is then brazed to another ductile metallic ring 52 which in turn is brazed to the flange of a tubular rigid metallic window support 54. As in the case of ring 42, the ductile metallic rings 48 and 52 serve to relieve stresses. The periphery of a disc-shaped window 56 which may be sapphire, for example, is slightly recessed within and brazed to window support 54..

A rod-shaped metallic anode 58 (tungsten, for example) is supported along the axis of tubular ceramic member 40 and window 56 by three triangular, metallic supports 60 which may be of molybdenum, for example. Each support has a notch into which terminal ring 50 is brazed. Supports 60 provide electrically conductive paths between anode 58 and terminal ring 50. Each of the metallic supports 60 is bent into the shape of a spiral for stress release during high temperature expensive states.

A rod-shaped cathode 62 (e.g. thoriated tungsten) is supported adjacent anode 58 and the axis thereof by a metallic cup 64. This cup, which may be Kovar, for example, and which forms a portion of the sealed envelope, is brazed about the periphery of an aperture in ellipsoidal member 44. A copper exhaust tubulation 66 communicates through the cup into the interior region of the envelope. Once the envelope has been filled with xenon, for example, and pressurized, the copper tubulation is pinched off thereby confining the pressurized gas within the sealed envelope.

In addition to xenon, mentioned above, it is known that other inert gases such as argon and krypton may be used in short arc lamps. Mercury vapor has also been used in short arc lamps, usually with a metal halide additive such as the iodides of thallium, gallium, indium and thorium which have excited states of relatively low energy compared to mercury, thereby increasing the total light output and the light flux density. In structures according to this invention, it is possible to use in addition to the above sodium, potassium, lithium, rubidium and cesium in pure metal vapor form, or in halide form. These metal vapors could not be used according to the teaching of the prior art because of their high degree of reactivity with silica. The fact that they can be used in structures according to this invention enables a further increase in light output and light flux density to be obtained in embodiments of this invention.

The shape of the reflector in embodiments of this invention may be varied to provide the desired beam output. For example, a spherical or elliptical reflector would be used if a converging beam is desired, the elliptical reflector providing the least aberration. A parabolic reflector would be used if a parallel beam is desired. Reflectors of other shapes may also be used.

It will be seen that according to the teaching of this invention the electrodes of a short arc lamp may be made short and massive in order to pass large amounts of electrical current. The ceramic-to-metal seals used in embodiments of this invention can withstand much higher temperatures and much greater differential in thermal coefficient of expansion than glass-to-metal seals. Thus, the seals may be located much closer to the arc in addition to passing more electrical current. Large area electrical terminals and multiple supports for the electrodes may also be used to reduce electrical inductance and increase the electrical current handling capacity of embodiments of this invention. Embodiments of this invention are also capable of withstanding higher unit and total internal pressures than devices of the prior art because of their improved overall strength. All of these features make possible the generation of greater light flux density and greater total light at a given light flux density. In addition, embodiments of this invention may be more compact, for the reasons mentioned above, avoiding the practical problems associated with the elongated shape of devices according to the prior art.

Furthermore, embodiments of this invention may have an integral optical reflector and may use an optical window of any desired material depending on the application for which the embodiment is designed. Finally, the materials used according to the teaching of this invention offer many structural advantages due to their strength and chemical characteristics as pointed out hereinabove.

It should be understood that the above-described embodiments are merely illustrative of applications of the principals of the invention. Obviously, many modifications may be made in the two illustrated examples without departing from the spirit and scope of the invention as set forth in the following claims.

What is claimed is:

1. An arm lamp having a sealed envelope comprising, a ceramic cylinder section, hermetically closed at each end by envelope members, one of said envelope members being an optical window, said envelope housing a cathode and an anode which are spaced apart a distance less than two centimeters to define a short arc gap therebetween, an ionizable gas under at least two standard atmospheres of pressure filling said short arc gap, and wherein an optical reflector is mounted within said envelope on the opposite side of said arc gap from said optical window.

2. An arc lamp as claimed in claim 1 wherein said reflector is spherical.

3. An arc lamp having a sealed envelope comprising, a ceramic cylinder section, hermetically closed at each end by envelope members, one of said envelope members being an optical window, said envelope housing a cathode and an anode which are spaced apart a distance less than two centimeters to define a short arc gap therebetween, an ionizable gas under at least two standard atmospheres of pressure filling said short arc gap, and wherein the other of said envelope members is in optical reflector.

4. An arc lamp as claimed in claim 3 wherein said cathode and said anode are axially spaced along the axis of said ceramic cylinder section, and one of said cathode and said anode penetrates said reflector in hermetically sealed relation thereto.

5. An arc lamp according to claim 4 wherein said reflector is elliptical and said arc gap is located at the near focal point of said reflector.

6. An arc lamp as claimed in claim 4 wherein the other one of said cathode and said anode is mounted on a metallic ring by a plurality of metallic supports, said metallic ring comprising a portion of said one envelope member and providing an electrical terminal in said envelope.

7. An arc lamp as claimed in claim 3 wherein said ceramic is selected from the group consisting of alumina and beryllia.

8. An arc lamp as claimed in claim 3 wherein the other of said envelope members is metallic.

9. An arc lamp as claimed in claim 1 wherein said cathode and said anode are disposed perpendicular to the axis of said ceramic cylinder section.

10. An arc lamp as claimed in claim 9 wherein said cathode and anode penetrate the side wall of said ceramic cylinder section and are sealed thereto.

11. An arc lamp as claimed in claim 3 wherein said cathode and said anode are disposed along the axis of said ceramic cylinder section.

12. An arc lamp as claimed in claim 3 wherein said one of said envelope members comprises a material pervious to the passage of electromagnetic energy in the spectral range bounded by the far-infrared and far-ultraviolet.

13. An arc lamp as claimed in claim 3 wherein said one of said envelope members is a sapphire window.

14. An arc lamp as claimed in claim 3 wherein said ionizable gas includes an inert gas selected from the group consisting of xenon, argon and krypton.

15. An arc lamp as claimed in claim 3 wherein said ionizable gas includes a metal vapor selected from the group consisting of mercury, cesium, rubidium, sodium, potassium and lithium, and combinations thereof.

16. An arc lamp as claimed in claim 3 wherein said ionizable gas includes an inert gas selected from the group consisting of xenon, argon, and krypton and a metal vapor consisting of mercury, cesium, rubidium, sodium, potassium and lithium, and combination thereof.

17. An arc lamp having a sealed envelope comprising a ceramic cylinder section hermetically closed at each end by envelope members, one of said envelope members comprising an optical window in the form of a circular disk having a metallic flange hermetically sealed to the outer periphery thereof, said metallic flange being also hermetically sealed to one end of this ceramic cylinder section and providing an electrical connection through said envelope, the other envelope member providing an elliptical optical reflector within said envelope, said envelope housing a cathode and an anode which are axially spaced apart a distance less than two centimeters along the axis of said ceramic cylinder section to define a short arc gap therebetween at the near focal point of said elliptical reflector, an ionizable gas under at least two standard atmospheres of pressure filling said short arc gap, one of said cathode and said anode being mounted on and electrically connected to said metallic flange and the other of said cathode and said anode being mounted on and extending through said other envelope member in hermetically sealed relation thereto.

References Cited

UNITED STATES PATENTS

| | | | |
|---|---|---|---|
| 2,714,687 | 8/1955 | Isaacs et al. | 313—214 |
| 2,945,146 | 7/1960 | Meyer | 313—113 |
| 2,971,110 | 2/1961 | Schmidt | 313—221 |
| 3,022,444 | 2/1962 | Fischer | 313—231 X |
| 3,054,921 | 9/1962 | Lye | 313—112 |
| 3,304,457 | 2/1967 | Mastrup | 313—184 |

JAMES W. LAWRENCE, Primary Examiner

RAYMOND F. HOSSFELD, Assistant Examiner

U.S. Cl. X.R.

313—113, 184, 214. 22